United States Patent
Kojima

(10) Patent No.: US 7,701,188 B2
(45) Date of Patent: *Apr. 20, 2010

(54) SYNCHRONOUS RECTIFICATION SWITCHING REGULATOR, AND CONTROL CIRCUIT AND CONTROL METHOD THEREFOR

(75) Inventor: Shinichi Kojima, Osaka (JP)

(73) Assignee: Ricoh Company, Ltd. (JP)

( * ) Notice: Subject to any disclaimer, the term of this patent is extended or adjusted under 35 U.S.C. 154(b) by 260 days.

This patent is subject to a terminal disclaimer.

(21) Appl. No.: 11/882,817

(22) Filed: Aug. 6, 2007

(65) Prior Publication Data
US 2008/0036443 A1      Feb. 14, 2008

(30) Foreign Application Priority Data
Aug. 10, 2006   (JP) ............................. 2006-218370

(51) Int. Cl.
*G05F 1/40* (2006.01)
(52) U.S. Cl. .................. 323/284; 323/225; 323/271
(58) Field of Classification Search ......... 323/282–290, 323/224, 272, 351, 259, 268, 271; 363/16, 363/21.12, 19, 98, 41
See application file for complete search history.

(56) References Cited

U.S. PATENT DOCUMENTS 6,724,174 B1 *   4/2004   Esteves et al. ............... 323/224
7,166,992 B2 *   1/2007   Kudo et al. .................. 323/282

FOREIGN PATENT DOCUMENTS

JP   2000-02924   3/2000
JP   2005-168173   6/2005

* cited by examiner

*Primary Examiner*—Rajnikant B Patel
(74) *Attorney, Agent, or Firm*—Dickstein Shapiro LLP

(57) ABSTRACT

A synchronous rectification switching regulator, and a control circuit and a control method for controlling the synchronous rectification switching regulator. The regulator includes an output terminal, a first switching device, an inductor, a second switching device for synchronous rectification, a control circuit unit to control switching of the first switching device and cause the second switching device to perform switching opposite to that of the first switching device, and a reverse current detection circuit unit to detect a generation or an indication of a reverse current flowing from the output terminal to the second switching device and make the control circuit unit turn off the second switching device when a generation or an indication of the reverse current is detected. The reverse current detection circuit unit stops detecting a generation or an indication of the reverse current while the second switching device is turned off by the control circuit unit.

26 Claims, 12 Drawing Sheets

|  | INPUT | | | OUTPUT |
|---|---|---|---|---|
|  | — | 1+ | 2+ | SA |
| CASE 1 | GND | L | POSITIVE | L |
| CASE 2 | GND | H | NEGATIVE | L |
| CASE 3 | GND | H | POSITIVE | H |

SYNCHRONOUS RECTIFICATION SWITCHING REGULATOR, AND CONTROL CIRCUIT AND CONTROL METHOD THEREFOR

CROSS-REFERENCE TO RELATED APPLICATION

This patent application claims priority from Japanese Patent Application No. 2006-218370 filed on Aug. 10, 2006 in the Japan Patent Office, the entire contents of which are hereby incorporated by reference herein.

BACKGROUND

1. Field of the Invention

This patent specification relates to a synchronous rectification switching regulator, and more particularly, to a synchronous rectification switching regulator capable of operating at high frequencies and with high efficiency at low load currents, and a control circuit and a control method for controlling the synchronous rectification switching regulator.

2. Discussion of Related Art

There are known a synchronous rectification system and a non-synchronous rectification system as rectification systems for a step-down DC-DC converter with an inductor. Such a step-down DC-DC converter operates in two modes: a continuous mode during high loads and a discontinuous mode during low loads. In the continuous mode, a current continuously flows through an inductor. In the discontinuous mode, there are times during which no current flows through the inductor. In the synchronous rectification system, a step-down DC-DC converter operates at high efficiency in the continuous mode. In the discontinuous mode, a reverse current is generated, i.e., a current flows backward from a load side to ground through a synchronous rectification transistor, which leads to an extreme efficiency drop. To prevent the reverse current, a step-down switching regulator 100 illustrated in FIG. 1 is used.

In FIG. 1, when a pulse width modulated (PWM) signal is low, a switching transistor SWa is turned on, and the output of an AND circuit 102 is low, thereby turning off a synchronous rectification transistor SWb. Consequently, electrical power is supplied from a power supply Vdd to an output terminal 103 through the switching transistor SWa and an inductor La.

When a PWM signal is high, the switching transistor SWa is turned off. The voltage at a node a lowers to a negative voltage due to the back electromotive force by the inductor La, and therefore the output of a comparator 101 is high. As a result, both inputs to the AND circuit 102 are high, and thus the output of the AND circuit 102 is high, thereby turning on the synchronous rectification transistor SWb. Consequently, electrical power is supplied from a ground power supply Vss to the output terminal 103 through the synchronous rectification transistor SWb and the inductor La.

Then, in the discontinuous mode, in which a low load current flows through a load connected to the output terminal 103, the current flowing in the direction from the ground power supply Vss to the output terminal 103 gradually decreases to zero while the PWM signal is high. Thereafter, a current flows in the reversed direction, i.e., from the output terminal 103 to the ground power supply Vss, causing the voltage at the node a to be reversed to positive and the output of the comparator 101 to be low. Therefore, the output of the AND circuit 102 is low, which turns off the synchronous rectification transistor SWb, thus preventing generation of the reverse current from the output terminal 103 to the ground power supply Vss.

With advances in semiconductor technology, transistors that can perform switching to high frequencies have been produced. In addition, reduction in size of components including capacitors and inductors are desired for portable devices, for example, a mobile telephone. However, inductors have a current rating and the current rating of a small inductor is not large. To maximize the capabilities of such a small inductor, it is desirable that the switching frequencies of the switching transistor SWa and the synchronous rectification transistor SWb be increased. In a step-down switching regulator, when a current continuously flows, i.e., under high loads, a current $i_{max}$ flowing through an inductor has the following relationship:

$$i_{max}=i_{out}+V_{out}/(2 \times L) \times T_{off}$$

where $i_{out}$ represents the output current from an output terminal, $V_{out}$ represents the output voltage from the output terminal, L represents the inductance of the inductor, and $T_{off}$ represents a period of time during which a switching transistor is off. Thus, in maintaining the output voltage $V_{out}$, an on-duty cycle of the switching transistor is independent of the frequency of an oscillator circuit that is used in generating PWM signals.

In FIG. 1, when the PWM signal changes from low to high, the switching transistor SWa is immediately turned off, whereas the synchronous rectification transistor SWb remains off until the comparator 101 changes its output to high. When the switching transistor SWa is off, a current flows from the inductor La, and therefore a current flows from the ground power supply Vss to the output terminal 103. At this point, when the synchronous rectification transistor SWb is off, a current flows through the synchronous rectification transistor SWb via a parasitic diode thereof. Therefore, the efficiency drops under high loads as a current flows via the parasitic diode. As the frequency of the PWM signal increases, the period of off-time of the synchronous rectification transistor SWb affects the efficiency. To deal with this, it is desirable that the comparator 101 respond quickly by increasing a bias current in the comparator 101.

Under low loads, as in the case of high loads, the synchronous rectification transistor SWb remains off until the comparator 101 reacts and changes its output to high when the PWM signal changes from low to high. However, the output current $i_{out}$ is small during low loads. Thus, the drop of efficiency caused by the current flowing via the parasitic diode of the synchronous rectification transistor SWb is relatively small in comparison with that during high loads. When the synchronous rectification transistor SWb is turned on and the current flowing from the ground power supply Vss to the output terminal 103 is reduced to zero, a reverse current begins to flow backward from the output terminal 103 to the ground power supply Vss. To cut off this current, the synchronous rectification transistor SWb is turned off by using the comparator 101 and the AND circuit 102. In this case, when the comparator 101 responds slowly, a current flows backward from the output terminal 103 to the ground power supply Vss, resulting in a drop of efficiency. Therefore, it is desirable that the comparator 101 respond quickly to reduce a time delay in the comparator 101. Thus, increasing a bias current in the comparator 101 is desired.

However, when a bias current is increased in the comparator 101 during low loads, the current consumption of the step-down switching regulator 100 increases, resulting in decrease of efficiency. This occurs particularly in pulse frequency modulation (PFM) control that thins switching operations.

SUMMARY

This patent specification describes a novel synchronous rectification switching regulator that includes an output terminal, a first switching device to perform switching according to an input control signal, an inductor to store energy by the switching of the first switching device, a second switching device for synchronous rectification to perform switching according to an input control signal for the inductor to release the energy, a control circuit unit to control the switching of the first switching device to make an output voltage output from the output terminal a constant voltage and cause the second switching device to perform switching opposite to the switching of the first switching device, and a reverse current detection circuit unit to detect a generation or an indication of a reverse current flowing in the direction from the output terminal to the second switching device and make the control circuit unit turn off and cut off the second switching device when a generation or an indication of the reverse current is detected. The reverse current detection circuit unit stops detecting a generation or an indication of the reverse current while the second switching device is turned off and cut off by the control circuit unit.

This patent specification further describes a novel control circuit for controlling a synchronous rectification switching regulator including an output terminal, a first switching device to perform switching according to an input control signal, an inductor to store energy by the switching of the first switching device, and a second switching device for synchronous rectification to perform switching according to an input control signal for the inductor to release the energy, the control circuit for controlling the synchronous rectification switching regulator including a control circuit unit to control the switching of the first switching device to make an output voltage output from the output terminal a constant voltage and cause the second switching device to perform switching opposite to the switching of the first switching device and a reverse current detection circuit unit to detect a generation or an indication of a reverse current flowing in the direction from the output terminal to the second switching device and make the control circuit unit turn off and cut off the second switching device when a generation or an indication of the reverse current is detected. The reverse current detection circuit unit stops detecting a generation or an indication of the reverse current while the second switching device is turned off and cut off by the control circuit unit.

This patent specification further describes a novel control method for controlling a synchronous rectification switching regulator including an output terminal, a first switching device to perform switching according to an input control signal, an inductor to store energy by the switching of the first switching device, and a second switching device for synchronous rectification to perform switching according to an input control signal for the inductor to release the energy, wherein the switching of the first switching device is controlled to make an output voltage output from the output terminal a constant voltage and the second switching device is caused to perform switching opposite to the switching of the first switching device, the control method for controlling the synchronous rectification switching regulator including the steps of detecting a generation or an indication of a reverse current flowing in the direction from the output terminal to the second switching device, turning off and cutting off the second switching device, and stopping detecting a generation or an indication of the reverse current while the second switching device is turned off and cut off.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF EMBODIMENTS

Figure 1:
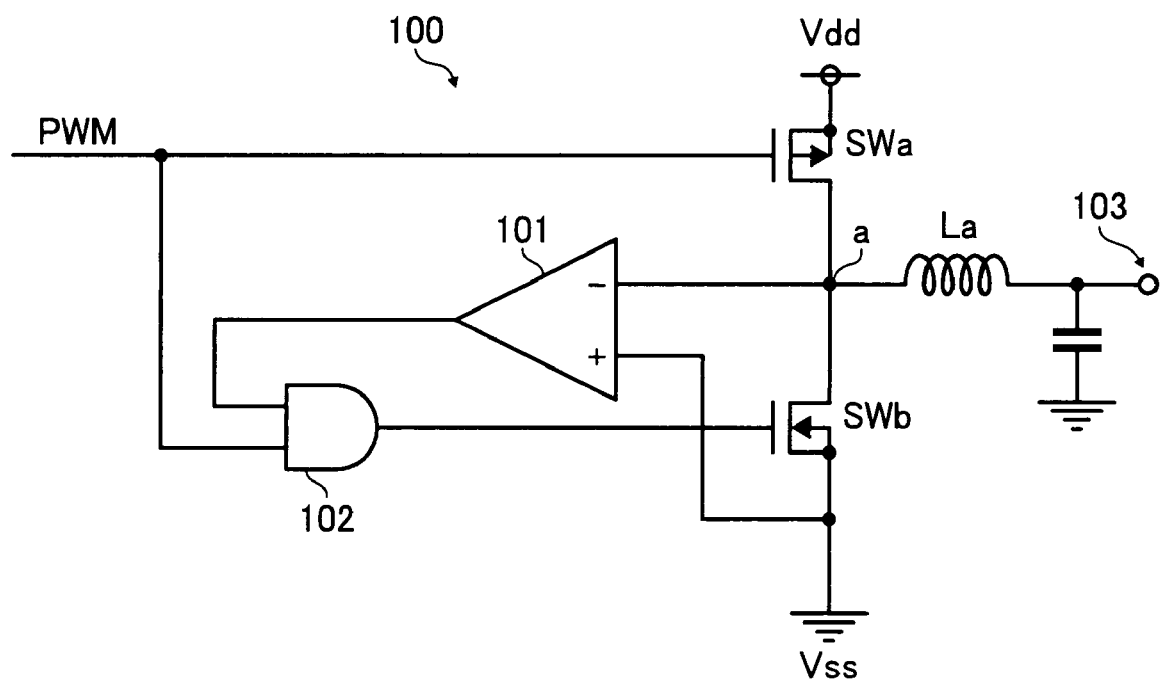
FIG. 1 is a diagram illustrating an example circuit of a typical step-down switching regulator.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, synchronous rectification switching regulators according to example embodiments are described.

Figure 2:
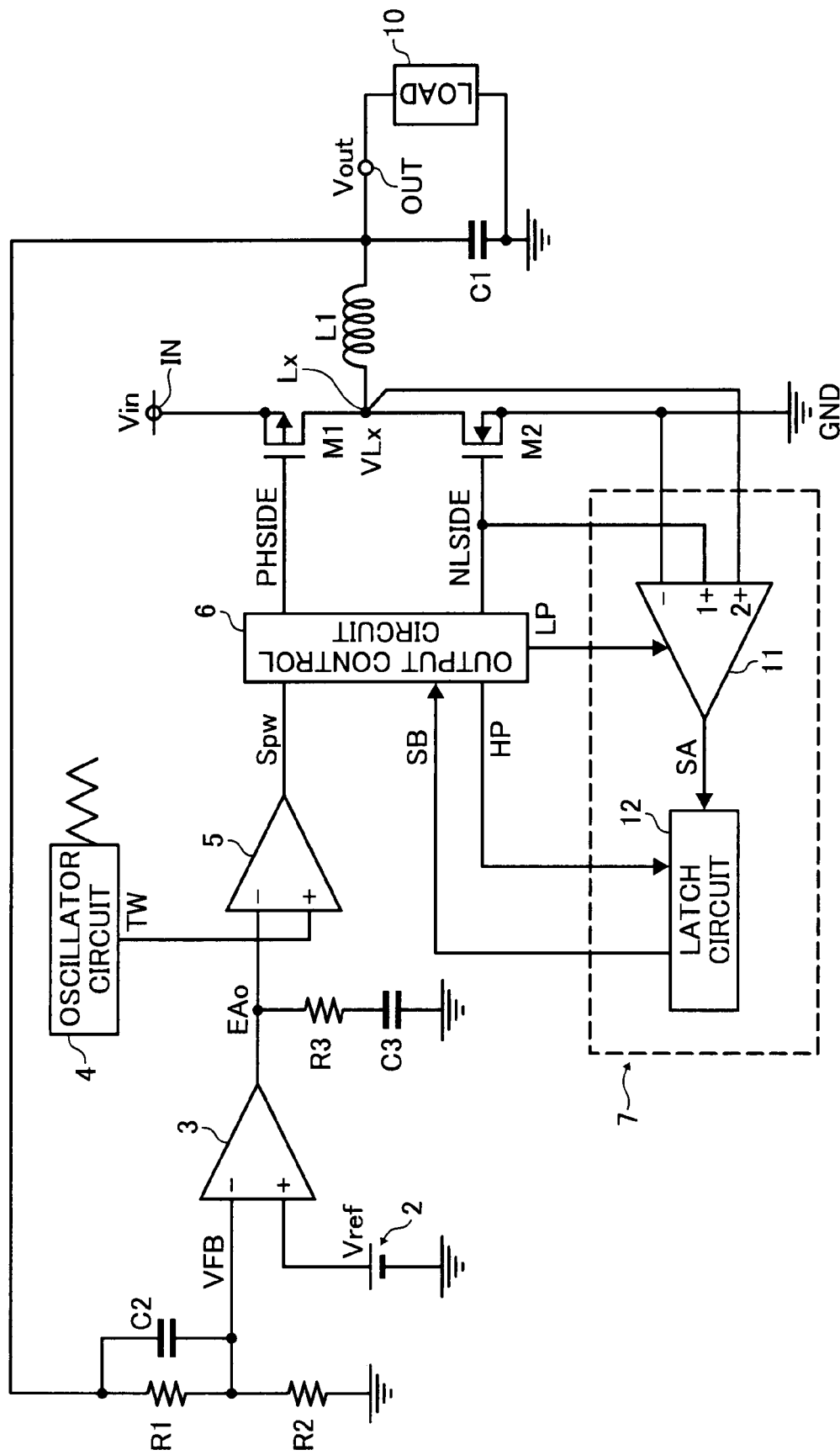
FIG. 2 is a diagram illustrating an example circuit of a synchronous rectification switching regulator according to a first embodiment of the present invention.

FIG. 2 is a diagram illustrating an example circuit of a synchronous rectification switching regulator according to a first embodiment of the present invention.

In FIG. 2, a switching regulator 1 is a synchronous rectification switching regulator that converts an input voltage $V_{in}$ applied to an input terminal IN to a constant output voltage. This constant output voltage is output from an output terminal OUT to a load 10 as an output voltage $V_{out}$.

The switching regulator 1 includes a switching transistor M1 and a synchronous rectification transistor M2 for controlling output of the input voltage $V_{in}$. The switching transistor M1 includes a PMOS transistor. The synchronous rectification transistor M2 includes a NMOS transistor.

The switching regulator 1 further includes a reference voltage generating circuit 2, resistors R1 and R2 for detecting the output voltage $V_{out}$, an inductor L1, a capacitor C1 for smoothing the output voltage $V_{out}$, a resistor R3 and capacitors C2 and C3 for phase compensation, an error amplifier circuit 3, an oscillator circuit 4, a PWM comparators, an output control circuit 6, and a reverse current detection circuit 7. The reverse current detection circuit 7 includes a comparator 11 and a latch circuit 12. The comparator 11 includes first and second non-inverting input terminals 1+ and 2+, and an inverting input terminal −.

The switching transistor M1 forms a first switching device and the synchronous rectification transistor M2 forms a second switching device. The reference voltage generating circuit 2, the resistors R1, R2, and R3, the error amplifier circuit 3, the oscillator circuit 4, the PWM comparator 5, the output control circuit 6, and the capacitors C2 and C3 form a control circuit unit. The output control circuit 6 and the reverse current detection circuit 7 form a reverse current detection circuit unit.

Each circuit included in the switching regulator 1, excluding the inductor L1 and the capacitor C1, may be included in one integrated circuit (IC). Alternatively, each circuit included in the switching regulator 1, excluding one or both of the switching transistor M1 and the synchronous rectification transistor M2, the inductor L1, and the capacitor C1, may be included in one IC.

The reference voltage generating circuit 2 generates and outputs a reference voltage Vref. The resistors R1 and R2 divide the output voltage $V_{out}$ to generate and output a divided voltage VFB. The error amplifier circuit 3 amplifies the voltage difference between the divided voltage VFB and the reference voltage Vref and generates and outputs an output signal EAo.

The oscillator circuit 4 generates and outputs a triangular wave signal TW. The PWM comparator 5 generates a pulse signal Spw for PWM control from the output signal EAo and the triangular wave signal TW and outputs the pulse signal Spw to the output control circuit 6. Based on the pulse signal Spw, the output control circuit 6 generates and outputs control signals PHSIDE and NLSIDE to the gates of the switching transistor M1 and the synchronous rectification transistor M2, respectively. The reverse current detection circuit 7 detects whether there is a generation or an indication of a reverse current that flows in the direction from the output terminal OUT to ground through the second switching device M2. When a generation or an indication of the reverse current is detected, the reverse current detection circuit 7 causes the output control circuit 6 to turn off and cut off the second switching device M2 so that generation of the reverse current is prevented.

The switching transistor M1 and the synchronous rectification transistor M2 are connected in series between the input terminal IN and a ground voltage GND. The junction of the switching transistor M1 and the synchronous rectification transistor M2 is referred to as a junction Lx. The inductor L1 is connected between the junction Lx and the output terminal OUT. The resistors R1 and R2 are connected in series between the output terminal OUT and the ground voltage GND. The capacitor C1 is also connected between the output terminal OUT and the ground voltage GND. The divided voltage VFB is output from the junction of the resistors R1 and R2. The capacitor C2 is connected in parallel to the resistor R1. In the error amplifier circuit 3, the divided voltage VFB is applied to the inverting input terminal − and the reference voltage Vref is applied to the non-inverting input terminal +. The output terminal of the error amplifier circuit 3 is connected to the inverting input terminal − of the PWM comparator 5.

Forming a phase compensation circuit, the resistor R3 and the capacitor C3 are connected in series between the output terminal of the error amplifier circuit 3 and the ground voltage GND. The triangular wave signal TW is input to the non-inverting input terminal + of the PWM comparator 5. The PWM comparator 5 outputs a pulse signal Spw, which is input to the output control circuit 6. The output control circuit 6, which generates and outputs the control signals PHSIDE and NLSIDE based on the pulse signal Spw, also generates and outputs a control signal HP for resetting and initializing the latch circuit 12 and a control signal LP for switching a bias current flowing in the comparator 11.

The control signal PHSIDE is input to the gate of the switching transistor M1. The control signal NLSIDE is input to the gate of the synchronous rectification transistor M2 and to the first non-inverting input terminal 1+ of the comparator 11. The control signal LP is input to the comparator 11 and the control signal HP is input to the latch circuit 12. The second non-inverting input terminal 2+ of the comparator 11 is connected to the junction Lx. The inverting input terminal − of the comparator 11 is connected to the ground voltage GND. An output signal SA of the comparator 11 is input to the latch circuit 12 and an output signal SB of the latch circuit 12 is input to the output control circuit 6.

Figures 3, 4:
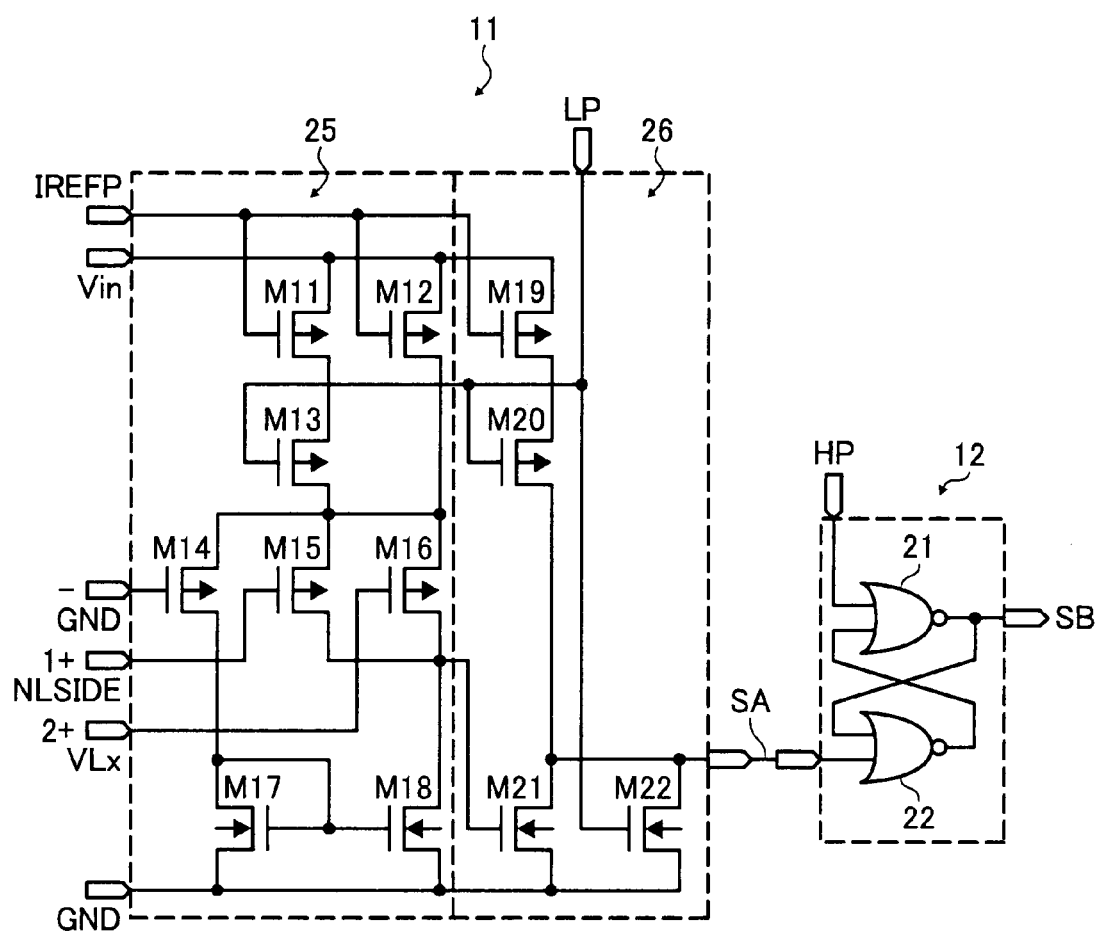
FIG. 3 is a table illustrating behavior of a comparator of FIG. 2.
FIG. 4 is a diagram illustrating an example circuit of the comparator and a latch circuit of FIG. 2.

FIG. 3 is a table illustrating the behavior of the comparator 11 having the structure described above. In case 1, when the control signal NLSIDE having a low level is input to the first non-inverting input terminal 1+, the output signal SA is forcibly changed to low. In cases 2 and 3, when the control signal NLSIDE is high, the comparator 11 outputs an output signal SA depending on the voltage at the second non-inverting input terminal 2+. Specifically, in the case 2, when the voltage at the second non-inverting input terminal 2+ is negative, i.e., below the ground voltage GND, the output signal SA is low. In the case 3, when the voltage at the second non-inverting input terminal 2+ is positive, i.e., above the ground voltage GND, the output signal SA is high. When the voltage at the second non-inverting input terminal 2+ is equal to the ground voltage GND, the output signal SA is high. The latch circuit 12 is set when the output signal SA changes from low to high, and is reset when the output signal HP changes from low to high.

When a voltage VLx at the junction Lx is below the ground voltage GND and there is no indication of the reverse current flowing from the junction Lx to ground, the output signal SA and the output signal SB are both low. In this state, when the output voltage $V_{out}$ increases, the voltage of the output signal EAo drops, reducing the duty cycle of the pulse signal Spw. Consequently, the on-time of the switching transistor M1 decreases and the on-time of the synchronous rectification transistor M2 increases so that the output voltage $V_{out}$ is reduced.

In contrast, when the output voltage $V_{out}$ decreases, the voltage of the output signal EAo rises, thereby increasing the duty cycle of the pulse signal Spw. Consequently, the on-time of the switching transistor M1 increases and the on-time of the synchronous rectification transistor M2 decreases so that the output voltage $V_{out}$ rises. The output voltage $V_{out}$ is set to a constant level by repeating the above operation.

Next, when the voltage VLx is the ground voltage GND and an indication of the reverse current is detected, or when the voltage VLx exceeds the ground voltage GND and a generation of the reverse current is detected, a high-level output signal SA is output from the comparator 11 and is latched by the latch circuit 12. The resulting output signal SB is then output to the output control circuit 6. While the output signal SB is high, the output control circuit 6 keeps the control signal NLSIDE low to turn off the synchronous rectification transistor M2 and also keeps the control signal LP high, which reduces current consumption and keeps the output signal SA low regardless of the result of the voltage comparison by the comparator 11.

The reverse current detection circuit 7 detects whether there is a generation or an indication of the reverse current, and turns off the synchronous rectification transistor M2 when such a generation or an indication is detected. Therefore, a current does not flow backward through the synchronous rectification transistor M2.

FIG. 4 is a diagram illustrating an example circuit of the comparator 11 and the latch circuit 12. The comparator 11 includes PMOS transistors M11, M12, M13, M14, M15, M16, M19, and M20, and NMOS transistors M17, M18, M21, and M22. The latch circuit 12 includes NOR circuits 21 and 22.

The PMOS transistors M11, M12, M13, M14, M15, and M16 and the NMOS transistors M17 and M18 form a differential amplifier circuit 25. The PMOS transistors M19 and M20 and the NMOS transistors M21 and M22 form an amplifier circuit 26.

With regard to the PMOS transistors M11, M12, and M19, each source is connected to the input voltage $V_{in}$ and a constant bias voltage IREFP is applied to the gate thereof. The PMOS transistors M11, M12, and M19 function as a constant current source. The PMOS transistors M11 and M12 supply a bias current to the differential amplifier circuit 25. The PMOS transistor M11 functions as a first constant current source and the PMOS transistor M12 functions as a second constant current source. The bias current is supplied to the differential amplifier circuit 25 by the two bias current sources: the PMOS transistors M11 and M12. The PMOS transistor M11 is much larger than the PMOS transistor M12, and supplies the majority of the bias current to the differential amplifier circuit 25. The PMOS transistor M19 functions as a constant current load for the amplifier circuit 26 and is also large in device size in comparison with the PMOS transistor 12, providing the amplifier circuit 26 with a large current drive capacity.

The PMOS transistor 14 is a transistor for inverting input in which the gate forms the inverting input terminal –. The PMOS transistors M15 and M16 are transistors for non-inverting input. The gates of the PMOS transistors M15 and M16 form the first non-inverting input terminal 1+ and the second non-inverting input terminal 2+, respectively. The PMOS transistor M15 has good drivability in comparison with the PMOS transistor M14. When the gate input of the PMOS transistor M15 is low, the output signal SA is low as described above. The sources of the PMOS transistors M14, M15, and M16 are connected with one another, one junction is connected to the drain of the PMOS transistor M12, and the other junction is connected to the drain of the PMOS transistor M11 through the PMOS transistor M13. The control signal LP is input to the gate of the PMOS transistor M13.

The NMOS transistors M17 and M18 form a current mirror circuit that functions as a load for the differential amplifier circuit 25. Each source of the NMOS transistors M17 and M18 is connected to the ground voltage GND. The gates of the NMOS transistors M17 and M18 are connected with each other and the junction thereof is connected to the drain of the NMOS transistor M17. The drain of the NMOS transistor M17 is connected to the drain of the PMOS transistor M14. The drain of the NMOS transistor M18 is connected to the drains of the PMOS transistors M15 and M16.

In the amplifier circuit 26, the PMOS transistors M19 and M20 and the NMOS transistor M21 are connected in series between the input voltage $V_{in}$ and the ground voltage GND. The junction of the PMOS transistor M20 and the NMOS transistor M21 forms the output terminal of the comparator 11. The gate of the NMOS transistor M21 is connected to the junction of the drains of the PMOS transistors M15 and M16 and the drain of the NMOS transistor M18. The junction of the drains of the PMOS transistors M15 and M16 and the drain of the NMOS transistor M18 forms the output terminal of the differential amplifier circuit 25. The NMOS transistor M22 is connected in parallel to the NMOS transistor M21. The control signal LP is input to the gates of the PMOS transistor M20 and the NMOS transistor M22.

In the latch circuit 12, the control signal HP is input to one input terminal of the NOR circuit 21. The other input terminal of the NOR circuit 21 is connected to the output terminal of the NOR circuit 22. The output terminal of the NOR circuit 21 forms the output terminal of the latch circuit 12 and is connected to one input terminal of the NOR circuit 22. To the other input terminal of the NOR circuit 22, the output signal SA is input.

Figure 5:
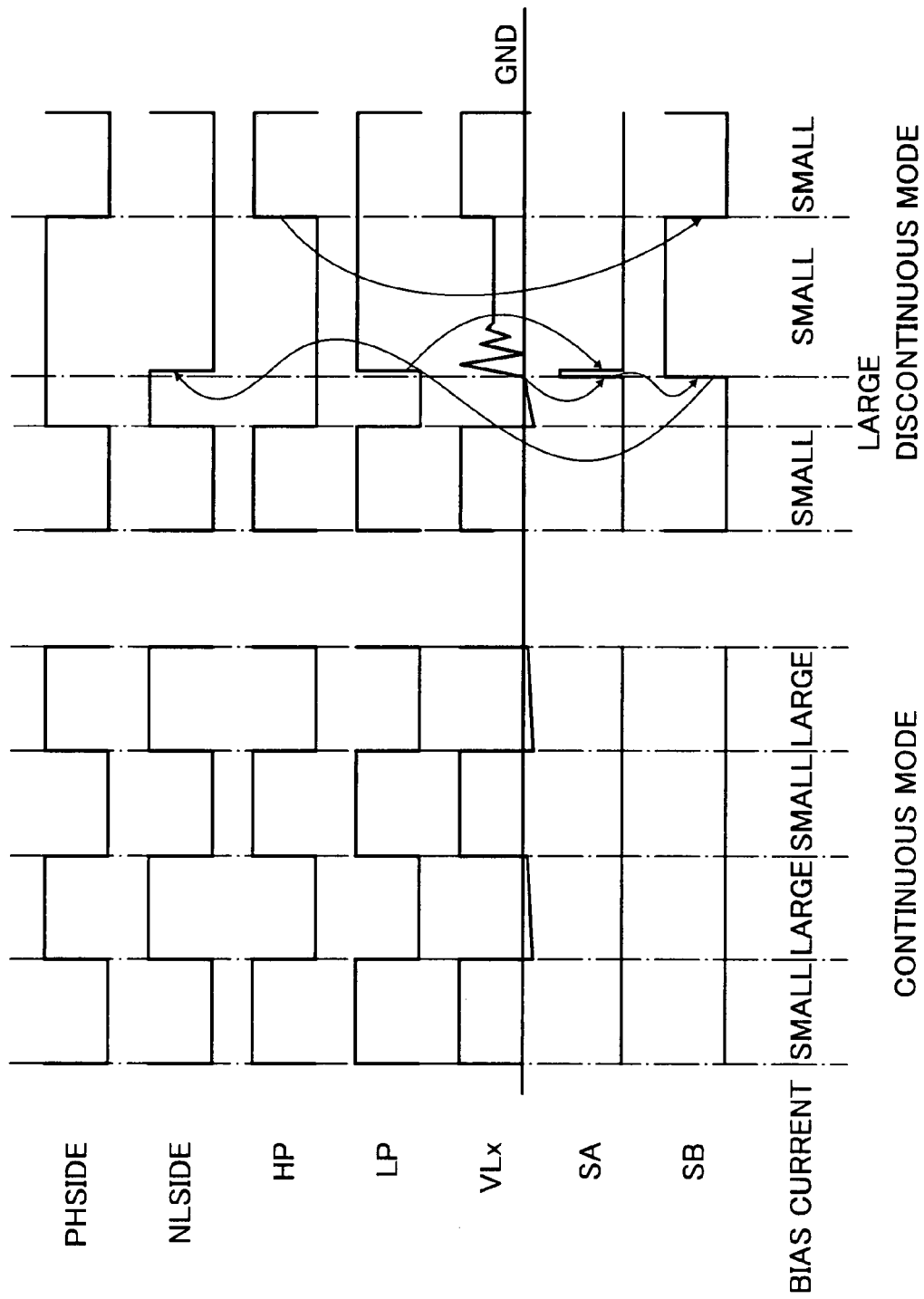
FIG. 5 is a timing chart illustrating an operation example of the synchronous rectification switching regulator of FIGS. 2 and 4.

FIG. 5 is a timing chart illustrating an operation example of the switching regulator 1 illustrated in FIGS. 2 and 4. The behavior of the switching regulator 1 is described in detail with reference to FIG. 5.

First, a continuous mode in which a current flows continuously through the inductor L1 under high loads is described.

The output control circuit 6 outputs the control signal PHSIDE to the gate of the switching transistor M1 and the control signal NLSIDE to the gate of the synchronous rectification transistor M2. The control signals PHSIDE and NLSIDE are in phase. When the control signals PHSIDE and NLSIDE are low, the switching transistor M1 is turned on and the synchronous rectification transistor M2 is turned off. When the control signals PHSIDE and NLSIDE are high, the switching transistor M1 is turned off and the synchronous rectification transistor M2 is turned on.

The control signal PHSIDE and the control signal HP are 180 degrees out of phase. The control signal NLSIDE and the control signal LP are 180 degrees out of phase. When the control signals PHSIDE and NLSIDE are low, the switching transistor M1 is turned on and the synchronous rectification transistor M2 is turned off. Therefore, the voltage VLx at the junction Lx is high. At this point, since the control signal LP is high, the PMOS transistors M13 and M20 are both turned off, and a large bias current generated by the PMOS transistor M11 is not supplied. In addition, since the PMOS transistor M19 functioning as a current load is not connected to the NMOS transistor M21, the current consumption of the comparator 11 is only the bias current generated by the PMOS transistor M12, meaning an extremely small current.

Further, when the control signal LP is high, the NMOS transistor M22 is turned on. Therefore, the output signal SA is fixed at the low level. In other words, when the switching transistor M1 is on, the output signal SA is low regardless of the result of the voltage comparison by the comparator 11, preventing a false operation of the reverse current detection circuit 7. At this point, the control signal HP is high and the output of the NOR circuit 21, that is, the output signal SB is low. Also, both the inputs to the NOR circuit 22 are low and the output terminal of the NOR circuit 22 is high.

When the control signals PHSIDE and NLSIDE are high, the switching transistor M1 is turned off and the current flowing from the input voltage $V_{in}$ is cut off. A back electromotive force is induced in the inductor L1, causing the voltage VLx to drop below zero. The voltage VLx is slightly below the ground voltage GND since the synchronous rectification transistor M2 is turned on. At this point, a current flows from the ground voltage GND to the output terminal OUT through the synchronous rectification transistor M2 and the inductor L1. The current flow is gradually reduced over time and the voltage VLx rises. In the continuous mode, the control signals PHSIDE and NLSIDE are low before the current is down to zero.

Since the control signal LP is low, the PMOS transistors M13 and M20 are turned on and a large bias current generated by the PMOS transistor M11 is supplied. In addition, since the PMOS transistor M19 operating as a current load is connected to the NMOS transistor M21, the comparator 11 consumes a large amount of current, which makes a high-speed operation possible. Further, since the NMOS transistor M22 is turned off, the output signal SA reflects the result of the voltage comparison by the comparator 11. In this case, however, the ground voltage GND is applied to the inverting input terminal – of the comparator 11, the control signal NLSIDE at the first non-inverting input terminal 1+ is high, and the voltage at the second non-inverting input terminal 2+ is negative. Therefore, the output signal SA remains low.

Next, a discontinuous mode in which there are times during which no current flows through the inductor L1 under low loads is described.

When the control signals PHSIDE and NLSIDE are low, the behavior of the switching regulator 1 in the discontinuous mode is the same as in the continuous mode. When the control signals PHSIDE and NLSIDE both are high, the switching transistor M1 is turned off and the synchronous rectification transistor M2 is turned on as described in the continuous mode. The voltage VLx is down to negative and a current flows in the direction from the ground voltage GND to the output terminal OUT through the synchronous rectification transistor M2 and the inductor L1. The current flow is gradually reduced with time and the voltage VLx rises. Then, a reverse current flows from the capacitor C1 connected to the output terminal OUT to the ground voltage GND through the inductor L1 and the synchronous rectification transistor M2. Thus, the voltage VLx changes from negative to positive.

The voltage at the second non-inverting input terminal 2+ of the comparator 11 becomes positive and the output signal SA changes from low to high. The output of the NOR circuit 22 is low. Since the control signal HP during this time period is low, the output signal SB of the NOR circuit 21 is high. When the output signal SB of the NOR circuit 21 is high, the output control circuit 6 makes the control signal LP high and the control signal NLSIDE low. At this point, the control signal LP is high, the PMOS transistors M13 and M20 are turned off, and the output signal SA changes from high to low. However, since the latch circuit 12 is in latching mode, the output signal SB remains high. Thus, the synchronous rectification transistor M2 remains off, prevents the reverse current from flowing from the output terminal OUT, and reduces the bias current in the comparator 11. The latch circuit 12 is reset to low when the control signal HP is high.

The voltage VLx is directly applied to the second non-inverting input terminal 2+ of the comparator 11 according to the first embodiment. The voltage VLx may be divided to be applied to the second non-inverting input terminal 2+ of the comparator 11 as illustrated in FIG. 6.

Figure 6:
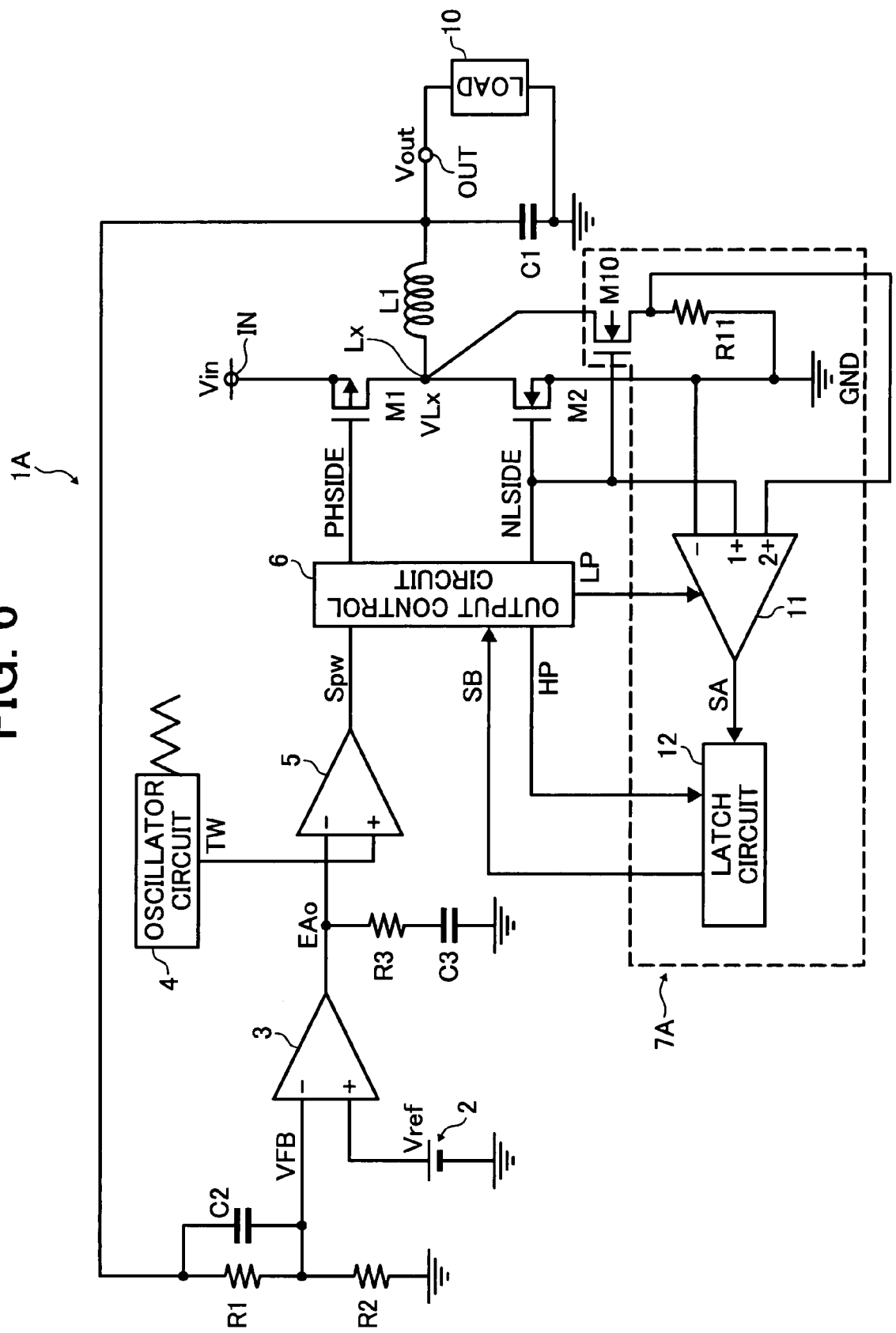
FIG. 6 is a diagram illustrating an example circuit of a synchronous rectification switching regulator according to a second embodiment of the present invention.

FIG. 6 is a diagram illustrating an example circuit of a synchronous rectification switching regulator according to a second embodiment of the present invention. In FIG. 6, the same reference numerals as those of FIG. 2 designate the same components, and a description thereof will be omitted. The following description is given of a difference between the switching regulator 1 of FIG. 2 and a switching regulator 1A of FIG. 6.

The switching regulator 1A is the same as the switching regulator 1, except that a NMOS transistor M10 and a resistor R11 are added to a reverse current detection circuit 7A and a voltage obtained by dividing a voltage VLx is applied to a second non-inverting input terminal 2+ of a comparator 11.

In FIG. 6, the NMOS transistor M10 and the resistor R11 are connected in series between a junction Lx and the ground voltage GND. The junction of the NMOS transistor M10 and the resistor R11 is connected to the second non-inverting input terminal 2+ of the comparator 11. A control signal NLSIDE is input to the gate of the NMOS transistor M10.

When the control signal NLSIDE is high, a synchronous rectification transistor M2 and the NMOS transistor M10 are turned on. The voltage obtained by dividing the voltage VLx by the ratio of the on resistance of the NMOS transistor M10 and the resistor R11 is applied to the second non-inverting input terminal 2+ of the comparator 11.

When the control signal NLSIDE is low, the synchronous rectification transistor M2 and the NMOS transistor M10 are turned off. The second non-inverting input terminal 2+ of the comparator 11 is connected to the ground voltage GND through the resistor R11.

The offset voltage of the comparator 11 is adjusted such that an output signal SA is low when a same voltage is applied to an inverting input terminal – and the second non-inverting input terminal 2+. Consequently, the comparator 11 can reduce the adverse impact of the noise superimposed on the voltage VLx and perform voltage comparison by dividing the voltage VLx to a desired voltage.

Figure 7:
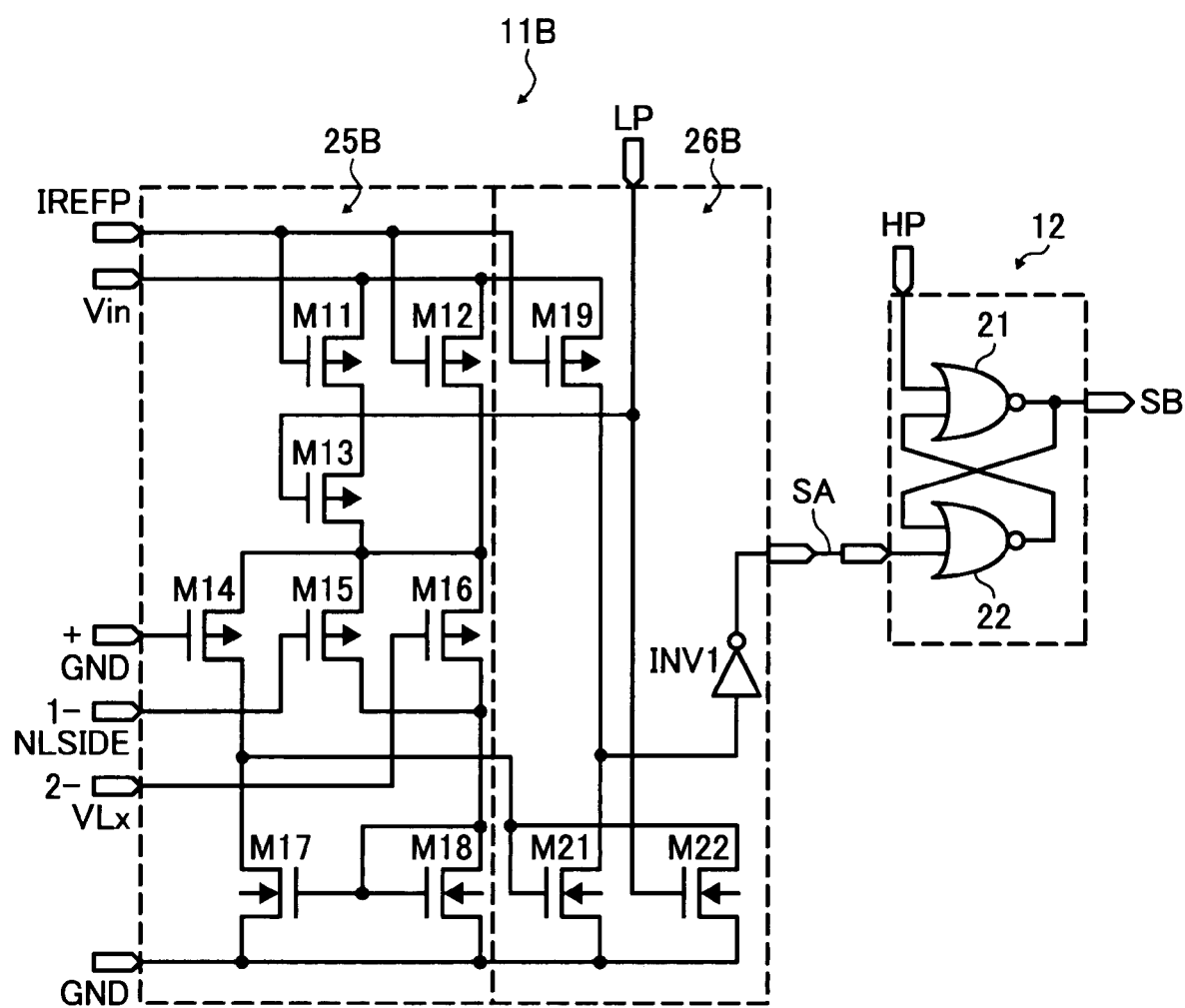
FIG. 7 is a diagram illustrating an example circuit of a comparator and a latch circuit according to a third embodiment of the present invention.

The comparator 11 may have first and second inverting input terminals 1– and 2–, and a non-inverting input terminal +, as illustrated in FIG. 7. FIG. 7 is a diagram illustrating an example circuit of a comparator 11B and a latch circuit 12 according to a third embodiment of the present invention. The comparator 11B has first and second inverting input terminals 1– and 2–, and a non-inverting input terminal +. In FIG. 7, the same reference numerals as those of FIG. 4 designate the same components, and a description thereof will be omitted. The following description is given of a difference between the comparator 11 of FIG. 4 and the comparator 11B of FIG. 7.

The comparator 11B is the same as the comparator 11, except that the PMOS transistor M20 illustrated in FIG. 4 is removed, an inverter INV1 is added, the gate of a NMOS transistor M21 is connected to the junction of a PMOS transistor M14 and a NMOS transistor M17, the drain of a NMOS transistor M22 is connected to the gate of the NMOS transistor M21, and the gates of the NMOS transistors M17 and M18 are connected to the drain of the NMOS transistor M18.

In FIG. 7, the comparator 11B includes PMOS transistors M11, M12, M13, M14, M15, M16, and M19, the NMOS transistors M17, M18, M21, and M22, and the inverter INV1. The PMOS transistors M11, M12, M13, M14, M15, and M16 and the NMOS transistors M17 and M18 form a differential amplifier circuit 25B. The PMOS transistor M19, the NMOS transistors M21 and M22, and the inverter INV1 form an amplifier circuit 26B.

The PMOS transistor M14 is a transistor for non-inverting input in which the gate forms the non-inverting input terminal +. The PMOS transistors M15 and M16 are transistors for inverting input. The gates of the PMOS transistors M15 and M16 form the first inverting input terminal 1− and the second inverting input terminal 2−, respectively. The NMOS transistors M17 and M18 form a current mirror circuit that functions as a load for the differential amplifier circuit 25B. Each source of the NMOS transistors M17 and M18 is connected to the ground voltage GND. the gates of the NMOS transistors M17 and M18 are connected with each other and the junction thereof is connected to the drain of the NMOS transistor M18.

In the amplifier circuit 26B, the PMOS transistor M19 and the NMOS transistor M21 are connected in series between the input voltage $V_{in}$ and the ground voltage GND. The input terminal of the inverter INV1 is connected to the junction of the PMOS transistor M19 and the NMOS transistor M21. The output terminal of the inverter INV1 forms the output terminal of the comparator 11B. The gate of the NMOS transistor M21 is connected to the junction of the drain of the PMOS transistors M14 and the drain of the NMOS transistor M17. The junction of the drain of the PMOS transistors M14 and the drain of the NMOS transistor M17 forms the output terminal of the differential amplifier circuit 25B. The NMOS transistor M22 is connected between the gate of the NMOS transistor M21 and the ground voltage GND. The control signal LP is input to the gate of the NMOS transistor M22.

The comparator 11B having the configuration described above can operate in the same way as the comparator 11.

Figure 8:
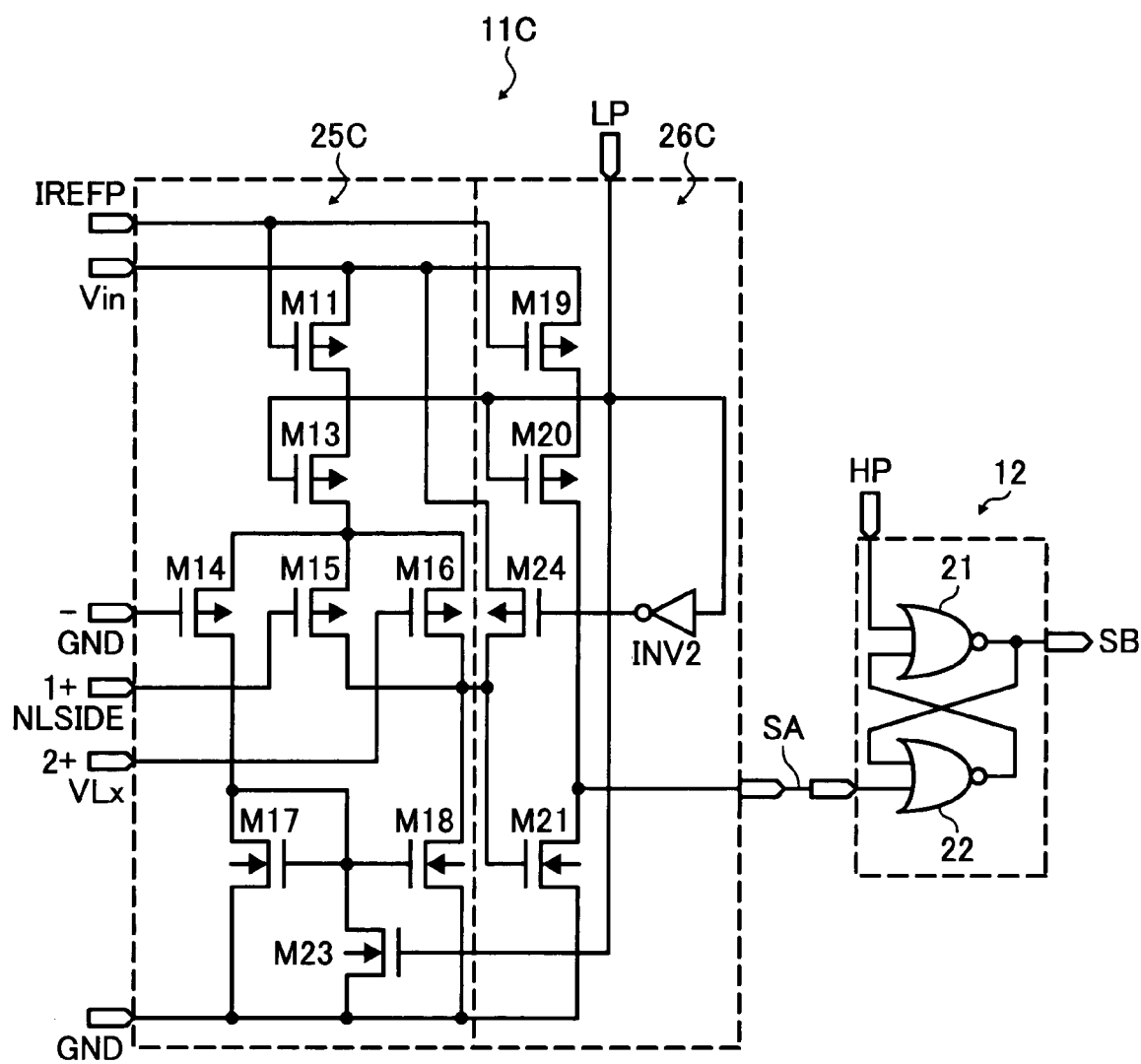
FIG. 8 is a diagram illustrating an example circuit of a comparator and a latch circuit according to a fourth embodiment of the present invention.

The comparator 11 performs voltage comparison even when the control signal LP is high. The comparator 11 may stop voltage comparison and makes the output signal SA low when the control signal LP is high. FIG. 8 is a diagram illustrating an example circuit of a comparator 11C and a latch circuit 12 according to a fourth embodiment of the present invention. The comparator 11C stops voltage comparison and makes an output signal SA low when a control signal LP is high. In FIG. 8, the same reference numerals as those of FIG. 4 designate the same components, and a description thereof will be omitted. The following description is given of a difference between the comparator 11 of FIG. 4 and the comparator 11C of FIG. 8.

The comparator 11C is the same as the comparator 11, except that the PMOS transistor M12 and the NMOS transistor M22 illustrated in FIG. 4 are removed, and a NMOS transistor M23, a PMOS transistor M24, and an inverter INV2 are added.

In FIG. 8, the comparator 11C includes PMOS transistors M11, M13, M14, M15, M16, M19, M20, and M24, NMOS transistors M17, M18, M21, and M23, and the inverter INV2.

The PMOS transistors M11, M13, M14, M15, and M16 and the NMOS transistors M17, M18, and M23 form a differential amplifier circuit 25C. The PMOS transistors M19 and M20, the NMOS transistors M21 and M24, and the inverter INV2 form an amplifier circuit 26C.

Each of the PMOS transistors M11 and M19 functions as a constant current source by applying an input voltage $V_{in}$ to the source thereof and a constant bias voltage IREFP to the gate thereof. The PMOS transistors M11 supplies a bias current to the differential amplifier circuit 25C. The PMOS transistor M19 functions as a constant current load for the amplifier circuit 26C. The sources of the PMOS transistors M14, M15, and M16 are connected with one another, and the junction thereof is connected to the drain of the PMOS transistor M11 through the PMOS transistor M13. The NMOS transistor M23 is connected between the junction of the gates of the NMOS transistors M17 and M18 and the ground voltage GND. The control signal LP is input to the gate of the NMOS transistor M23.

In the amplifier circuit 26C, the PMOS transistor M24 is connected between the input voltage $V_{in}$ and the gate of the NMOS transistor M21. The control signal LP is inverted by the inverter INV2 and the inverted signal is input to the gate of the PMOS transistor M24.

When the control signal LP is low in the configuration described above, the PMOS transistors M13 and M20 are turned on and the NMOS transistor M23 and the PMOS transistor M24 are turned off. Thus, the comparator 11C generates the output signal SA depending on the result of the voltage comparison.

Next, when the control signal LP is high, the PMOS transistors M13 and M20 are turned off and the NMOS transistor M23 and the PMOS transistor M24 are turned on. Consequently, the differential amplifier circuit 25C stops operating, the NMOS transistor M21 is turned on, and the output signal SA is low. In the output control circuit 6, the timing when the control signal LP is low is controlled to be before the control signal NLSIDE is high.

In other words, when the control signal LP is high, the comparator 11C stops voltage comparison and makes the output signal SA low, and the differential amplifier circuit 25C stops operating and the current is not consumed. Thus, the amount of current consumed by the comparator 11C is further reduced when the synchronous rectification transistor M2 is turned off by the control signal NLSIDE.

In the embodiments described above, the switching regulator increases the bias current flowing through the comparator after the synchronous rectification transistor M2 is turned on, and quickly detects when the voltage VLx rises to a positive voltage. The period of time from when the voltage VLx rises to a positive voltage to when the synchronous rectification transistor M2 is turned off can be greatly reduced and the reverse current generated during the period of time can be reduced, thereby improving efficiency during low loads.

In addition, when the synchronous rectification transistor M2 is turned off, the amount of current consumed by the comparator is sharply reduced, which leads to reduction in current consumption.

While the comparators 11, 11B, and 11C include three input terminals, the comparator may include two input terminals: a non-inverting input terminal + and an inverting input terminal −.

Figure 9:
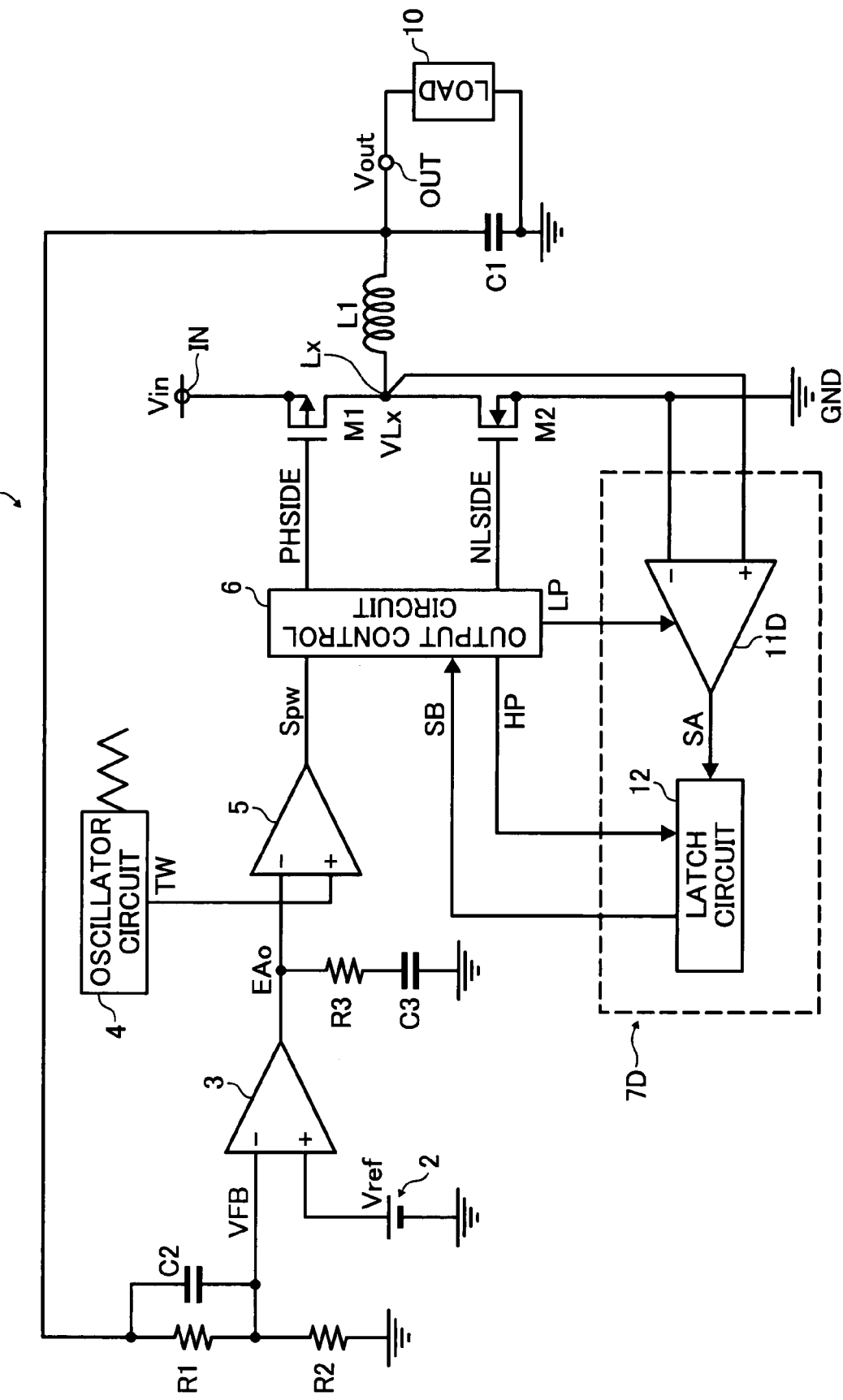
FIG. 9 is a diagram illustrating an example circuit of a synchronous rectification switching regulator according to a fifth embodiment of the present invention.

FIG. 9 is a diagram illustrating an example circuit of a switching regulator 1D according to a fifth embodiment of the present invention. In FIG. 9, the same reference numerals as those of FIG. 2 designate the same components, and a description thereof will be omitted. The following description is given of a difference between the switching regulator 1 of FIG. 2 and the switching regulator 1D of FIG. 9.

The switching regulator 1D is the same as the switching regulator 1, except for a comparator 11D that includes two input terminals: a non-inverting input terminal + and an inverting input terminal −.

In FIG. 9, the switching regulator 1D includes a switching transistor M1, a synchronous rectification transistor M2, a reference voltage generating circuit 2, resistors R1 and R2 for detecting an output voltage $V_{out}$, an inductor L1, a capacitor C1 for smoothing the output voltage $V_{out}$, a resistor R3 and capacitors C2 and C3 for phase compensation, an error amplifier circuit 3, an oscillator circuit 4, a PWM comparator 5, an output control circuit 6, and a reverse current detection circuit 7D. The reverse current detection circuit 7D includes the comparator 11D and a latch circuit 12. The comparator 11D includes the non-inverting input terminal + and the inverting input terminal −.

The output control circuit 6 and the reverse current detection circuit 7D form a reverse current detection circuit unit. Each circuit included in the switching regulator 1D, excluding the inductor L1 and the capacitor C1, may be included in one IC. Alternatively, each circuit included in the switching regulator 1D, excluding one or both of the switching transistor M1 and the synchronous rectification transistor M2, the inductor L1, and the capacitor C1, may be included in one IC.

The reverse current detection circuit 7D detects whether there is a generation or an indication of a reverse current that flows through the synchronous rectification transistor M2. When a generation or an indication of the reverse current is detected, the reverse current detection circuit 7D causes the output control circuit 6 to turn off and cut off the second switching device M2 so that generation of the reverse current is prevented. The non-inverting input terminal + of the comparator 11D is connected to a junction Lx. The inverting input terminal − of the comparator 11D is connected to the ground voltage GND. The output signal SA of the comparator 11D is input to the latch circuit 12 and an output signal SB of the latch circuit 12 is input to the output control circuit 6. The control signal LP and the control signal HP are input to the comparator 11D and the latch circuit 12, respectively.

When the control signal LP is low and the voltage at the non-inverting input terminal + is negative, i.e., below the ground voltage GND in the configuration described above, the output signal SA is low. When the control signal LP is low and the voltage at the non-inverting input terminal + is positive, i.e., above the ground voltage GND, the output signal SA is high. When the voltage at the non-inverting input terminal + is equal to the ground voltage GND, the output signal SA is high.

Next, when the control signal LP is high, the comparator 11D stops voltage comparison after a period of time to reduce current consumption and outputs a low output signal SA regardless of the voltage applied to the non-inverting input terminal +.

Figure 10:
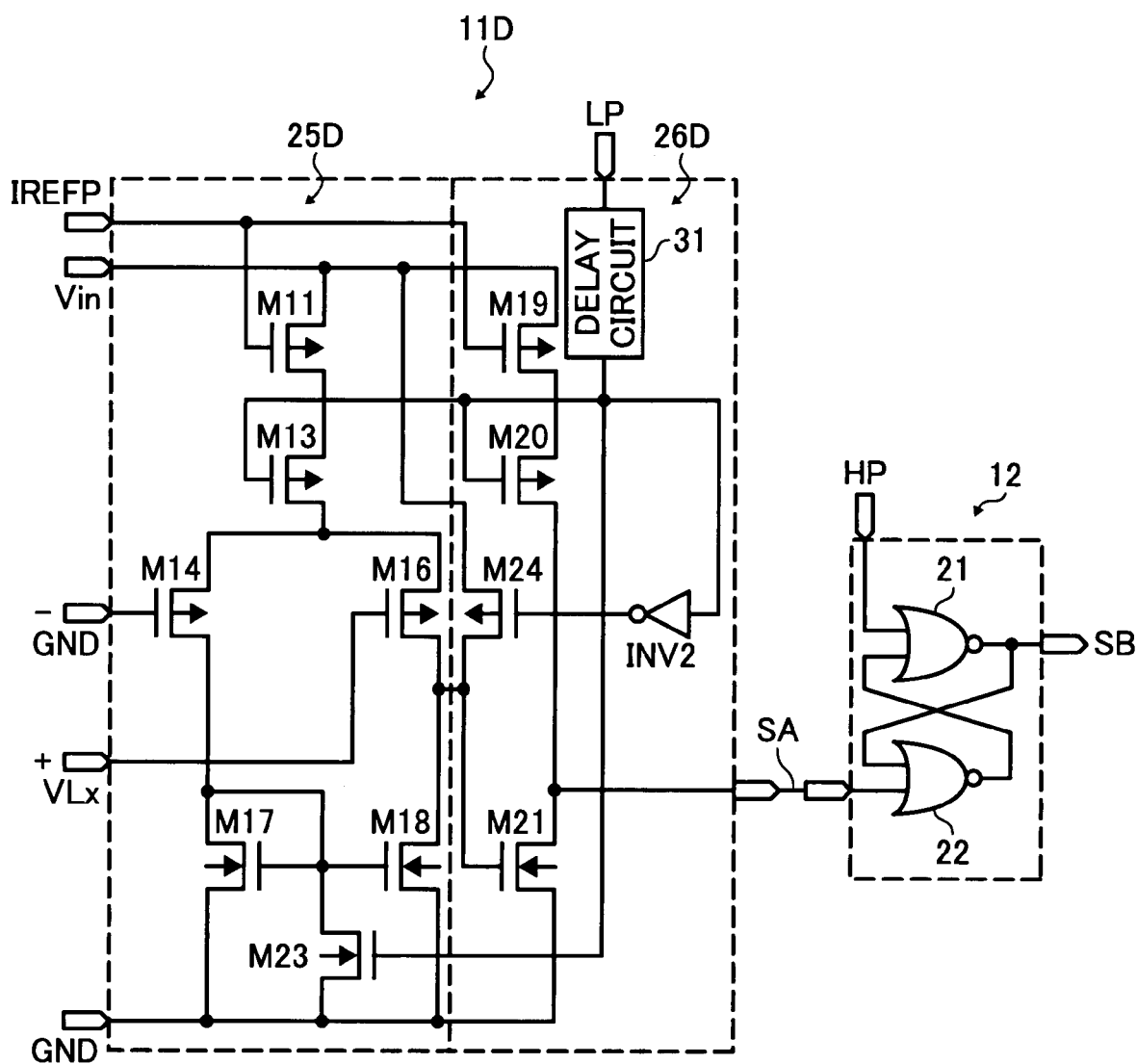
FIG. 10 is a diagram illustrating an example circuit of a comparator and a latch circuit of FIG. 9.

FIG. 10 is a diagram illustrating an example circuit of the comparator 11D and the latch circuit 12 of FIG. 9. In FIG. 10, the same reference numerals as those of FIG. 8 designate the same components, and a description thereof will be omitted. The following description is given of a difference between the comparator 11C of FIG. 8 and the comparator 11D of FIG. 10.

The comparator 11D is the same as the comparator 11C, except that the NMOS transistor M15 illustrated in FIG. 8 is removed and a delay circuit 31 is added.

In FIG. 10, the comparator 11D includes PMOS transistors M11, M13, M14, M16, M19, M20, and M24, NMOS transistors M17, M18, M21, and M23, an inverter INV2, and the delay circuit 31.

The delay circuit 31 delays the output of the control signal LP for a period of time only when the control signal LP changes from high to low. The delay circuit 31 does not delay the output of the control signal LP when the control signal LP changes from low to high.

The output signal of the delay circuit 31 is input to each gate of the PMOS transistors M13, M20 and M23. The output signal from the delay circuit 31 is then inverted by the inverter INV2 and input to the gate of the PMOS transistor M24. The time delay is not less than the time for determining that a signal level at the junction Lx has changed from high to low when the control signal LP changes from high to low.

The switching regulator 1D described above in the fifth embodiment can provide the same effect as that of the other embodiments, particularly that including the comparator 11C illustrated in FIG. 8. The switching regulator 1D can be configured without the PMOS transistor M15 of FIG. 8 by providing a period of time for the signal level at the junction Lx to change completely from high to low and activating the comparator 11D thereafter.

In the example embodiments described above, the reverse current is prevented from flowing through the synchronous rectification transistor M2 by turning off the synchronous rectification transistor M2. Alternatively, the reverse current may also be prevented from flowing through the synchronous rectification transistor M2 by turning off a MOS transistor that is connected in series to the synchronous rectification transistor M2.

Figure 11:
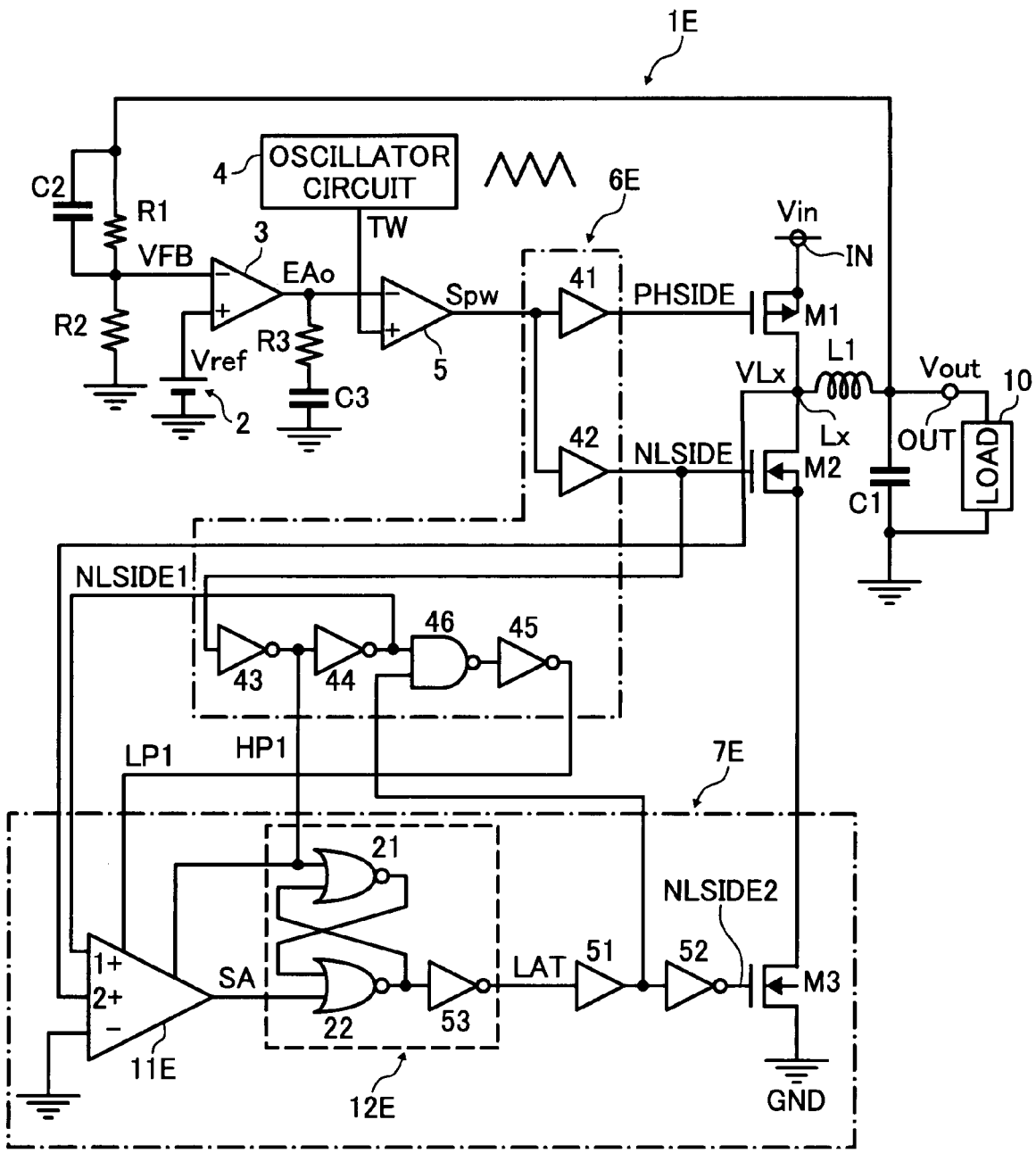
FIG. 11 is a diagram illustrating an example circuit of a synchronous rectification switching regulator according to a sixth embodiment of the present invention.

FIG. 11 is a diagram illustrating a switching regulator according to a sixth embodiment of the present invention that prevents the reverse current from flowing through the synchronous rectification transistor M2 by turning off a MOS transistor that is connected in series to the synchronous rectification transistor M2. In FIG. 11, the same reference numerals as those of FIG. 2 designate the same components, and a description thereof will be omitted. The following description is given of a difference between the switching regulator 1 of FIG. 2 and a switching regulator 1E of FIG. 11.

In FIG. 11, the switching regulator 1E is a synchronous rectification switching regulator that converts an input voltage $V_{in}$ applied to an input terminal IN to a constant output voltage, i.e., the output voltage $V_{out}$, which is output from an output terminal OUT is applied to a load 10.

The switching regulator 1E includes a switching transistor M1, a synchronous rectification transistor M2, a reference voltage generating circuit 2, resistors R1 and R2 for detecting the output voltage $V_{out}$, an inductor L1, a capacitor C1 for smoothing the output voltage $V_{out}$, a resistor R3 and capacitors C2 and C3 for phase compensation, an error amplifier circuit 3, an oscillator circuit 4, a PWM comparator 5, an output control circuit 6E, and a reverse current detection circuit 7E.

The output control circuit 6E includes buffers 41, 42, inverters 43, 44, and 45, and a NAND circuit 46. The reverse current detection circuit 7E includes a comparator 11E, a latch circuit 12E, a buffer 51, an inverter 52, and a switching transistor M3. The switching transistor M3 includes a NMOS transistor. The latch circuit 12E includes NOR circuits 21 and 22 and an inverter 53. The comparator 11E includes first and second non-inverting input terminals 1+ and 2+ and an inverting input terminal −.

The reference voltage generating circuit 2, the resistors R1, R2, and R3, the error amplifier circuit 3, the oscillator circuit 4, the PWM comparator 5, the output control circuit 6E, and the capacitors C2 and C3 form a control circuit unit. The output control circuit 6E and the reverse current detection circuit 7E form a reverse current detection circuit unit. The switching transistor M3 forms a third switching device.

Each circuits included in the switching regulator 1E, excluding the inductor L1 and the capacitor C1, may be included in one IC. Alternatively, each circuit included in the switching regulator 1E, excluding at least one or all of the switching transistor M1, the synchronous rectification transistor M2, and the switching transistor M3, the inductor L1, and the capacitor C1, may be included in one IC.

The reference voltage generating circuit 2 generates and outputs a reference voltage Vref. The resistors R1 and R2 divide the output voltage $V_{out}$ to generate and output a divided voltage VFB. The error amplifier circuit 3 amplifies the voltage difference between the divided voltage VFB and the reference voltage Vref and generates and outputs an output signal EAo.

The oscillator circuit 4 generates and outputs a triangular wave signal TW. The PWM comparator 5 generates and outputs a pulse signal Spw for PWM control from the output signal EAo and the triangular wave signal TW. The pulse signal Spw is input to the gate of the switching transistor M1 through the buffer 41 and to the gate of the synchronous rectification transistor M2 through the buffer 42. The reverse current detection circuit 7E detects whether there is a generation or an indication of a reverse current that flows through the synchronous rectification transistor M2. When a generation or an indication of the reverse current is detected, the reverse current detection circuit 7E turns off the switching transistor M3 so that the synchronous rectification transistor M2 is isolated from the ground voltage GND and generation of the reverse current is prevented.

The switching transistor M1, the synchronous rectification transistor M2, and the switching transistor M3 are connected in series between the input terminal IN and the ground voltage GND. The junction of the switching transistor M1 and the synchronous rectification transistor M2 is referred to as a junction Lx. The inductor L1 is connected between the junction Lx and the output terminal OUT. The resistors R1 and R2 are connected in series between the output terminal OUT and the ground voltage GND. The capacitor C1 is also connected between the output terminal OUT and the ground voltage GND. The divided voltage VFB is output from the junction of the resistors R1 and R2. The capacitor C2 is connected in parallel to the resistor R1. In the error amplifier circuit 3, the divided voltage VFB is applied to an inverting input terminal –, and the reference voltage Vref is applied to a non-inverting input terminal +. The output terminal of the error amplifier circuit 3 is connected to the inverting input terminal – of the PWM comparator 5.

Forming a phase compensation circuit, the resistor R3 and the capacitor C3 are connected in series between the output terminal of the error amplifier circuit 3 and the ground voltage GND. The triangular wave signal TW is input to the non-inverting input terminal + of the PWM comparator 5. The PWM comparator 5 outputs a pulse signal Spw, which is input to the gate of the switching transistor M1 through the buffer 41 as a control signal PHSIDE and to the gate of the synchronous rectification transistor M2 through the buffer 42 as a control signal NLSIDE. The inverters 43 and 44 are connected in series between the output terminal of the buffer 42 and one input terminal of the NAND circuit 46. An output signal of the inverter 43 is input to a first control signal input terminal of the comparator 11E as a control signal HP1. An output signal of the inverter 44 is input to the first non-inverting input terminal 1+ of the comparator 11E as a control signal NLSIDE1. An output signal of the NAND circuit 46 is inverted by the inverter 45 and is input to a second control signal input of the comparator 11E as a control signal LP1. A voltage VLx at the junction Lx is applied to the second non-inverting input terminal 2+ of the comparator 11E. The ground voltage GND is applied to the inverting input terminal – of the comparator 11E.

In the latch circuit 12E, the control signal HP1 is input to one input terminal of the NOR circuit 21 and the other input terminal is connected to the output terminal of the NOR circuit 22. The output terminal of the NOR circuit 22 is connected to the input terminal of the inverter 53. The output terminal of the inverter 53 forms the output terminal of the latch circuit 12E. An output signal LAT of the inverter 53 is input as a control signal NLSIDE2 to the gate of the switching transistor M3 through the buffer 51 and the inverter 52. The output terminal of the NOR circuit 21 is connected to one input terminal of the NOR circuit 22. An output signal SA of the comparator 11E is input to the other input terminal of the NOR circuit 22.

The junction of the output terminal of the buffer 51 and the input terminal of the inverter 52 is connected to the other input terminal of the NAND circuit 46.

Figure 12:
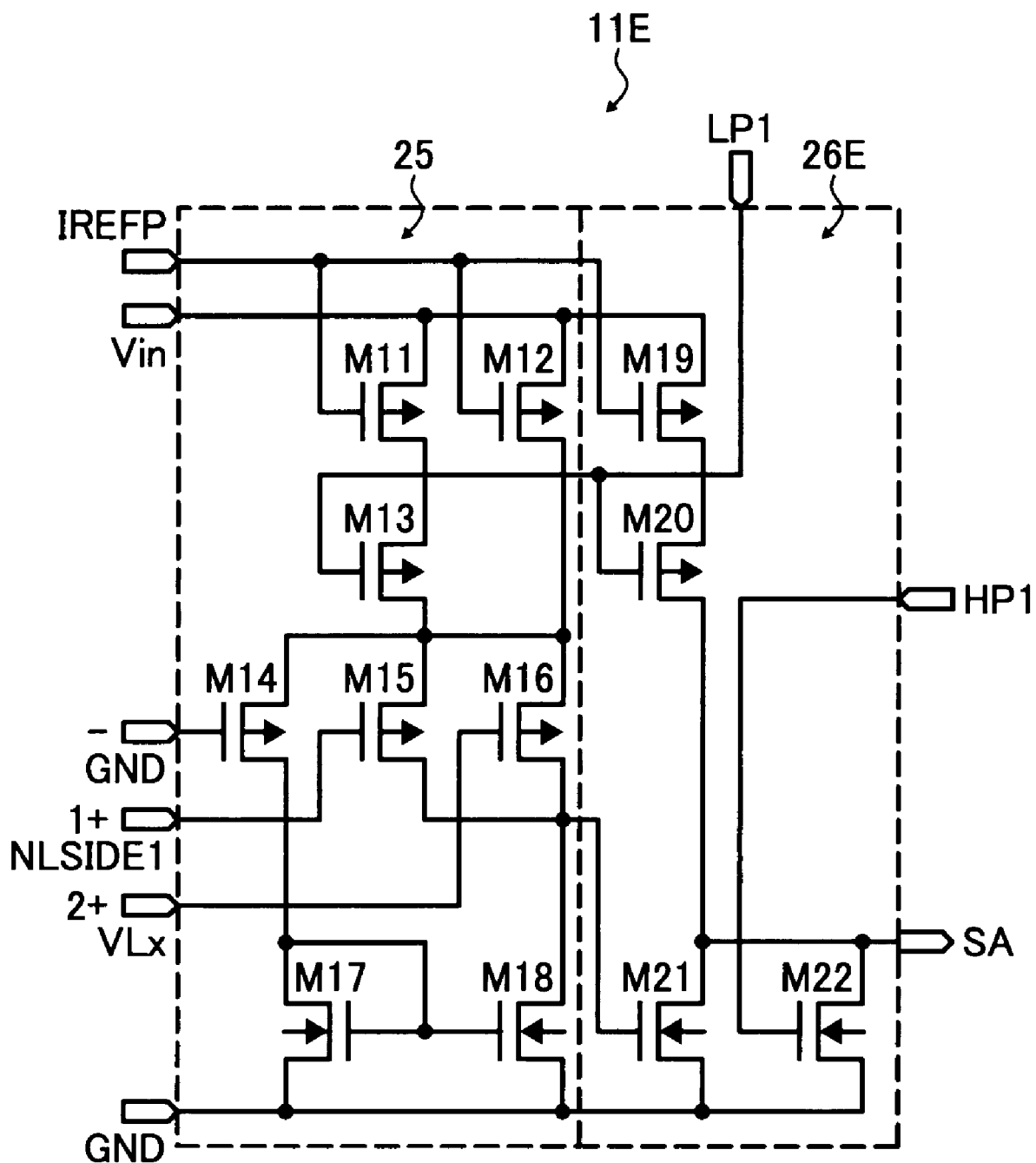
FIG. 12 is a diagram illustrating an example circuit of a comparator of FIG. 11.

FIG. 12 is a diagram illustrating an example circuit of the comparator 11E. In FIG. 12, the same reference numerals as those of FIG. 4 designate the same components, and a description thereof will be omitted. The following description is given of a difference between the comparator 11 of FIG. 4 and the comparator 11E of FIG. 12.

The comparator 11E is the same as the comparator 11, except that the control signal LP1 is input to the gates of PMOS transistors M13 and M20 and the control signal HP1 is input to the gate of a NMOS transistor M22.

Figure 13:
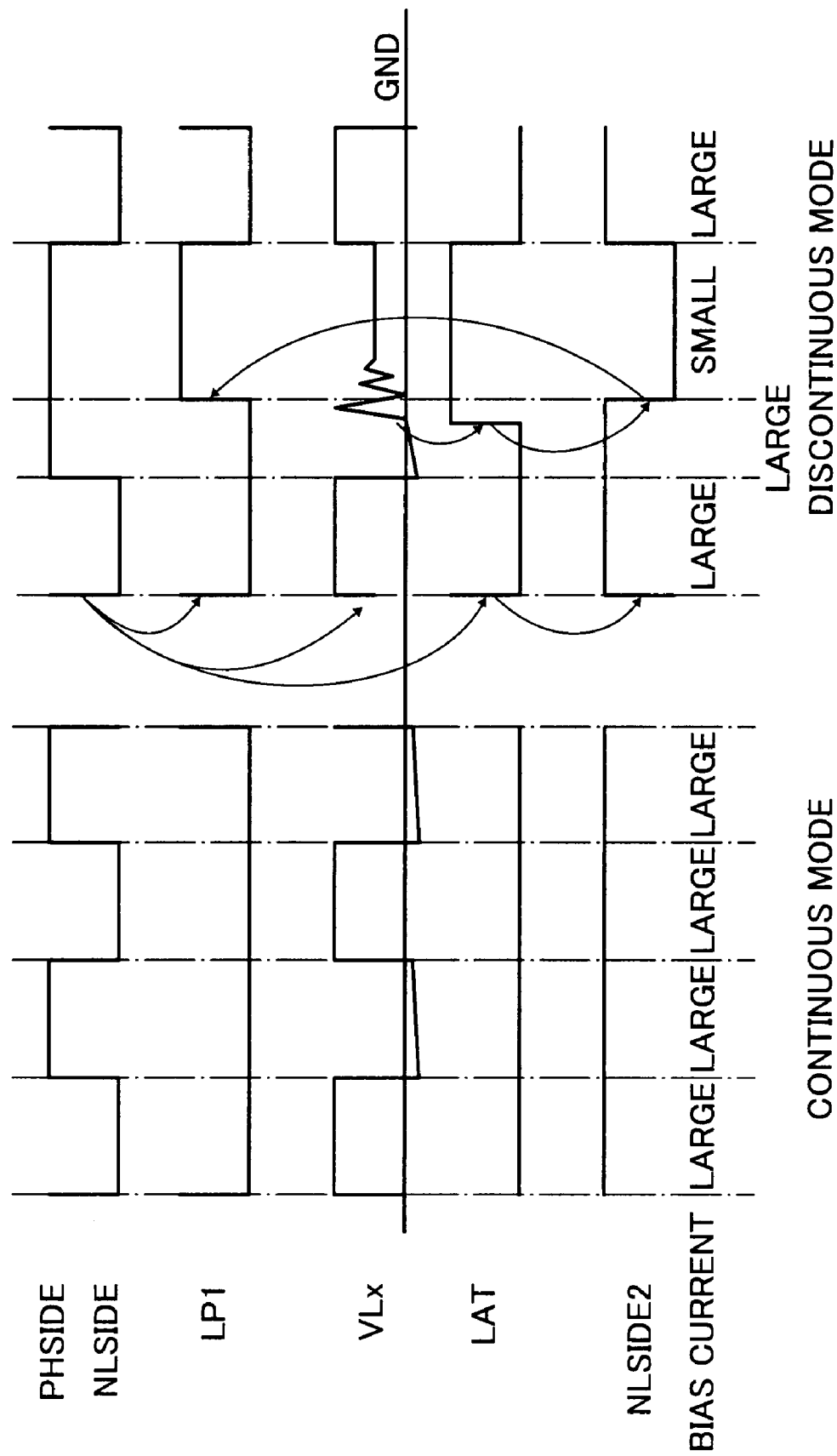
FIG. 13 is a timing chart illustrating an operation example of the synchronous rectification switching regulator of FIGS. 11 and 12.

FIG. 13 is a timing chart illustrating an operation example of the switching regulator 1E illustrated in FIGS. 11 and 12. The behavior of the switching regulator 1E is described in detail with reference to FIG. 13.

First, a continuous mode in which a current flows continuously through the inductor L1 under high loads is described.

The control signals PHSIDE and NLSIDE are in phase. The control signal NLSIDE and the control signal HP1 are 180 degrees out of phase. When the control signal PHSIDE changes from high to low, the switching transistor M1 is turned on, the synchronous rectification transistor M2 is turned off, and the voltage VLx is high.

Since the control signal HP1 is high and the control signal LP1 is low, the comparator 11E operates in quick response mode due to an increased bias current. The control signal NLSIDE1 that is in phase with the control signal NLSIDE is input to the first non-inverting input terminal 1+ of the comparator 11E. The control signal NLSIDE may be input to the first non-inverting input terminal 1+. The drivability of the PMOS transistor M15 that has the gate receiving the control signal NLSIDE1 is good in comparison with the drivability of the PMOS transistor M14 that has the gate receiving the ground voltage GND. Therefore, when the control signal NLSIDE1 is low, the output signal SA is low, and the comparator 11E does not operate to detect the reverse current. At this point, since the control signal HP1 is high, the output signal SA is low regardless of the result of the voltage comparison by the comparator 11E. Simultaneously, the latch circuit 12E is reset, and therefore the output signal LAT is low. As a result, the control signal NLSIDE2 is high, turning on the switching transistor M3.

Thereafter, when the control signals PHSIDE and NLSIDE are changed to high, the synchronous rectification transistor M2 is turned on and a current flows from the ground voltage GND to the output terminal OUT through the switching transistor M3 and the synchronous rectification transistor M2. At this point, the PMOS transistor M15 is off and the comparator 11E compares the voltage VLx with the ground voltage GND. In the continuous mode, when the control signal NLSIDE is high and the synchronous rectification transistor M2 is on, the voltage VLx is below the ground voltage GND and the output signal SA remains low. Since the control signal NLSIDE2 is high, the control signal LP1 is also low and the switching transistor M3 is on. Thus, in the continuous mode, the comparator 11E stays in quick response mode. Also, since a load current is large in the continuous mode, a little increase in current consumption of the switching regulator 1E hardly affects efficiency.

Next, a discontinuous mode in which there are times during which no current flows through the inductor L1 under low loads is described.

When the control signals PHSIDE and NLSIDE are low, the behavior of the switching regulator 1E in the discontinuous mode is the same as in the continuous mode. As in the continuous mode, the synchronous rectification transistor M2 is turned on and a current flows from the ground voltage GND to the output terminal OUT through the switching transistor M3 and the synchronous rectification transistor M2 when the control signals PHSIDE and NLSIDE both are high. At this point, the PMOS transistor M15 is off and the comparator 11E compares the voltage VLx with the ground voltage GND.

Then, when the voltage VLx rises to or above the ground voltage GND, the comparator 11E outputs a high output signal SA and sets the latch circuit 12E. The output signal LAT is latched high. Since the control signal NLSIDE2 is low, the switching transistor M3 is turned off and the reverse current is prevented from flowing. In addition, since the output signal LAT is high, the control signal LP1 is high, putting the comparator 11E in low current consumption mode. This state continues until the control signal PHSIDE is changed to low. Then, when the control signal PHSIDE is changed to low, the operation described above is performed.

In the switching regulator 1E, when the voltage VLx rises to or above the ground voltage GND in the discontinuous mode, the switching transistor M3 is turned off and the comparator 11E is put in the low current consumption mode by reducing the bias current flowing through the comparator 11E; otherwise the comparator 11E is put in the quick response mode by increasing the bias current flowing through the comparator 11E. The switching regulator 1E is capable of detecting when the voltage VLx rises to a positive voltage. Therefore, the period of time from when the voltage VLx rises to a positive voltage to when the switching transistor M3 is turned off can be greatly reduced and the reverse current generated during the period of time can be reduced, thereby improving efficiency during low loads.

In addition, when the switching transistor M3 is turned off, the amount of current consumed by the comparator 11E is greatly reduced, which leads to reduction in current consumption.

Numerous additional modifications and variations are possible in light of the above teachings. It is therefore to be understood that within the scope of the appended claims, the disclosure of this patent specification may be practiced otherwise than as specifically described herein.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program or computer program product. For example, the aforementioned methods may be embodied in the form of a system or device, including, but not limited to, any of the structures for performing the methodology illustrated in the drawings.

Even further, any of the aforementioned methods may be embodied in the form of a program. The program may be stored on a computer-readable medium and adapted to perform any one of the aforementioned methods when run on a computer device (a device including a processor). The program may include computer-executable instructions for carrying out one or more of the steps above, and/or one or more of the aspects of the invention. Thus, the storage medium or computer-readable medium is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetic storage media, including but not limited to floppy disks (trademark), cassette tapes, and removable hard disks; media with a built-in rewriteable non-volatile memory, including but not limited to memory cards; and media with a built-in ROM, including but not limited to ROM cassettes, etc. Furthermore, various information regarding stored images, for example, property information, may be stored in any other form, or provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A synchronous rectification switching regulator, comprising:
    an output terminal;
    a first switching device configured to perform switching according to a first input control signal to store energy across an inductor;
    a second switching device configured to perform switching according to a second input control signal for the inductor to release energy from the inductor;
    a control circuit unit configured to provide the respective first and second input control signals to the first and second switching devices to maintain an output voltage output from the output terminal at approximately a constant voltage and cause the second switching device to perform switching opposite to the switching of the first switching device; and
    a reverse current detection circuit unit configured to detect an indication of a reverse current flowing in the direction from the output terminal to the second switching device and make the control circuit unit turn off the second switching device when an indication of the reverse current is detected,
    wherein the reverse current detection circuit unit stops detecting an indication of the reverse current while the second switching device is turned off due to the indication of the reverse current.

2. The synchronous rectification switching regulator according to claim 1, wherein the reverse current detection circuit unit detects an indication of the reverse current based on a voltage at a junction of the first switching device and the inductor while the second switching device is turned on.

3. The synchronous rectification switching regulator according to claim 2, wherein once the reverse current detection circuit unit makes the control circuit unit turn off the second switching device, the control circuit unit maintains the second switching device turned off until the control circuit unit turns on the first switching device.

4. The synchronous rectification switching regulator according to claim 3, wherein the reverse current detection circuit unit comprises:

a voltage comparator configured to generate and output a signal when an indication of the reverse current is detected based on the voltage at the junction; and a latch circuit configured to latch and output the signal to the control circuit unit, wherein the voltage comparator reduces current consumption while the second switching device is turned off by the control circuit unit.

5. The synchronous rectification switching regulator according to claim 4, wherein, when the control circuit unit turns on the first switching device, the latch circuit is reset and makes the control circuit unit stop maintaining the second switching device turned off.

6. The synchronous rectification switching regulator according to claim 4, wherein the voltage comparator comprises a differential amplifier configured to perform voltage comparison and reduces a bias current supplied to the differential amplifier to reduce the current consumption.

7. The synchronous rectification switching regulator according to claim 6, wherein the differential amplifier comprises:

a first constant current source configured to supply a first constant current; and a second constant current source configured to supply a second constant current, wherein the first constant current source stops supplying the first constant current while the second switching device is turned off.

8. The synchronous rectification switching transistor according to claim 7, wherein the second constant current is low in comparison with the first constant current.

9. The synchronous rectification switching regulator according to claim 4, wherein the voltage comparator comprises a differential amplifier configured to perform voltage comparison and stops bias current supply in the differential amplifier to reduce the current consumption.

10. A synchronous rectification switching regulator, comprising:

an output terminal;

a first switching device configured to perform switching according to a first input control signal to store energy across an inductor;

a second switching device configured to perform switching according to a second input control signal for the inductor to release energy from the inductor;

a control circuit unit configured to provide the respective first and second input control signals to the first and second switching devices to maintain an output voltage output from the output terminal at approximately a constant voltage and cause the second switching device to perform switching opposite to the switching of the first switching device; and a reverse current detection circuit unit configured to detect an indication of a reverse current flowing in the direction from the output terminal to the second switching device and disconnect the second switching device from a ground voltage when an indication of the reverse current is detected, wherein the reverse current detection circuit unit stops detecting an indication of the reverse current while the second switching device is disconnected.

11. The synchronous rectification switching regulator according to claim 10, wherein the reverse current detection circuit unit detects an indication of the reverse current based on a voltage at a junction of the first switching device and the inductor while the second switching device is turned on.

12. The synchronous rectification switching regulator according to claim 11, wherein once the second switching device is disconnected, the second switching device remains disconnected until the control circuit unit turns on the first switching device.

13. The synchronous rectification switching regulator according to claim 12, wherein the reverse current detection circuit unit comprises:

a voltage comparator configured to generate and output a signal when an indication of the reverse current is detected based on the voltage at the junction;

a latch circuit configured to latch and output the signal to the control circuit unit; and a third switching device connected in series to the second switching device and configured to disconnect the second switching device by turning off according to the signal output from the latch circuit, wherein the voltage comparator reduces current consumption while the third switching device is turned off.

14. The synchronous rectification switching regulator according to claim 13, wherein the control circuit is further configured to reset the latch circuit and turn on the third switching device when the control circuit unit turns on the first switching device.

15. A control circuit for controlling a synchronous rectification switching regulator, the synchronous rectification switching regulator comprising:

an output terminal; and first and second switching devices configured to store and release energy across an inductor according to input control signals from the control circuit to maintain an output voltage at said output terminal at an approximately constant voltage;

the control circuit for controlling the synchronous rectification switching regulator comprising:

a control circuit unit configured to provide the input control signals to control the first and second switching devices to regulate output voltage output from the output terminal; and a reverse current detection circuit unit configured to detect an indication of a reverse current flowing in the direction from the output terminal to the second switching device and make the control circuit unit turn off the second switching device when an indication of the reverse current is detected, wherein the reverse current detection circuit unit stops detecting an indication of the reverse current while the second switching device is turned off due to the indication of the reverse current.

16. The control circuit according to claim 15, wherein the reverse current detection circuit unit detects an indication of the reverse current based on a voltage at a junction of the first switching device and the inductor while the second switching device is turned on.

17. The control circuit according to claim 16, wherein once the reverse current detection circuit unit makes the control circuit unit turn off the second switching device, the control circuit unit maintains the second switching device turned off until the control circuit unit turns on the first switching device.

18. A control circuit for controlling a synchronous rectification switching regulator, the synchronous rectification switching regulator comprising:

an output terminal; and first and second switching devices configured to store and release energy across an inductor according to input control signals from the control circuit to maintain an output voltage at said output terminal at an approximately constant voltage;

the control circuit for controlling the synchronous rectification switching regulator comprising:

a control circuit unit configured to provide the input control signals to control the first and second switching devices to regulate output voltage output from the output terminal; and a reverse current detection circuit unit configured to detect an indication of a reverse current flowing in the direction from the output terminal to the second switching device and disconnect the second switching device from a ground voltage when an indication of the reverse current is detected, wherein the reverse current detection circuit unit stops detecting an indication of the reverse current while the second switching device is disconnected.

19. The control circuit according to claim 18, wherein the reverse current detection circuit unit detects an indication of the reverse current based on a voltage at a junction of the first switching device and the inductor while the second switching device is turned on.

20. The control circuit according to claim 19, wherein once the second switching device is disconnected, the second switching device remains disconnected until the control circuit unit turns on the first switching device.

21. A method for controlling a synchronous rectification switching regulator, the synchronous rectification switching regulator comprising:

an output terminal;

a first switching device configured to perform switching according to a first input control signal to store energy across an inductor;

a second switching device configured to perform switching according to a second input control signal for the inductor to release energy from the inductor, wherein the switching of the first and second switching devices is controlled to maintain an output voltage output from the output terminal at approximately a constant voltage and cause the second switching device to perform switching opposite to the switching of the first switching device;

the method for controlling the synchronous rectification switching regulator comprising the steps of:

detecting an indication of a reverse current flowing in the direction from the output terminal to the second switching device;

turning off the second switching device when an indication of the reverse current is detected; and stopping detecting an indication of the reverse current while the second switching device is turned off due to the indication of the reverse current.

22. The method according to claim 21, wherein detecting an indication of the reverse current further comprises detecting a voltage at a junction of the first switching device and the inductor while the second switching device is turned on.

23. The method according to claim 22, further comprising, once the second switching device is turned off, continuing the operation of turning-off the second switching device until the first switching device is turned on.

24. A method for controlling a synchronous rectification switching regulator, the synchronous rectification switching regulator comprising:

an output terminal;

a first switching device configured to perform switching according to a first input control signal to store energy across an inductor;

a second switching device configured to perform switching according to a second input control signal for the inductor to release energy from the inductor, wherein the switching of the first and second switching devices is controlled to maintain an output voltage output from the output terminal at approximately a constant voltage and cause the second switching device to perform switching opposite to the switching of the first switching device;

the method for controlling the synchronous rectification switching regulator comprising the steps of:

detecting an indication of a reverse current flowing in the direction from the output terminal to the second switching device;

disconnecting the second switching device from a ground voltage when an indication of the reverse current is detected; and stopping detecting an indication of the reverse current while the second switching device is disconnected.

25. The method according to claim 24, wherein detecting an indication of the reverse current further comprises detecting a voltage at a junction of the first switching device and the inductor while the second switching device is turned on.

26. The method according to claim 22, further comprising, once the second switching device is disconnected, continuing the operation of disconnecting the second switching device until the first switching device is turned on.

* * * * *